Figure 1:
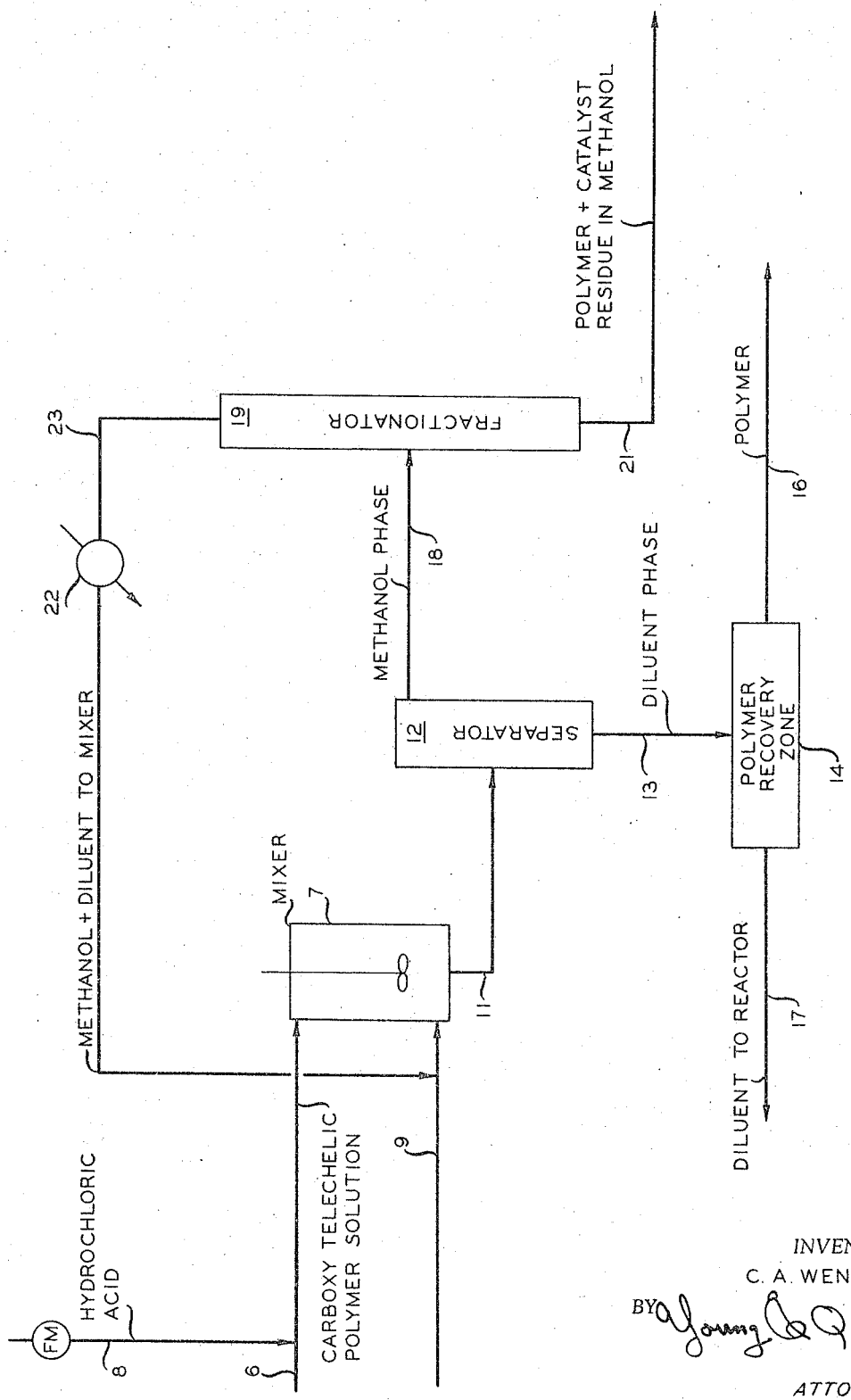

3,309,348
PURIFICATION OF CARBOXY-TERMINATED
POLYMERS
Charles A. Wentz, Jr., Bartlesville, Okla., assignor to Phillips Petroleum Company, a corporation of Delaware
Filed Apr. 5, 1963, Ser. No. 270,880
4 Claims. (Cl. 260—94.7)

This invention relates to the purification of telechelic polymers. In another aspect it relates to the removal of lithium-containing residues from telechelic polymers.

Telechelic polymers are conveniently prepared by polymerization of conjugated dienes and other monomers in the presence of organolithium initiators. Immediately following polymerization the reaction mixture is treated with an appropriate reagent, such as carbon dioxide, ethylene oxide, or the like, which reacts at the carbon-lithium bond, thereby resulting in a terminal functional group containing lithium. Reagents such as water, acid, or the like, can be used for removal of the lithium, i.e., by replacement of the lithium with hydrogen, with the resultant formation of carboxy telechelic polymers. When aqueous treating agents are employed, the lithium compound formed as a by-product is present in the aqueous phase which, upon separation from the organic phase, should give a polymer solution free from lithium-containing residues.

A number of telechelic polymers, such as those of the aforementioned types, tend to form emulsions when water is present in recovery operations, and phase separation is extremely difficult. One method which has been developed for recovery of telechelic polymers, particularly those containing carboxy groups, comprises treating the polymer solution with anhydrous hydrogen chloride, thus circumventing the emulsion problem. Concurrently, lithium chloride is formed as finely divided dispersion in the polymer solution. If the lithium chloride is not removed, it remains as ash in the finished polymer.

Thus, the treated telechelic polymer product, to which this invention is directed, is visually obtained as a solution, which also contains the organo alkali metal catalyst inorganic residue, typically lithium chloride. The selective extraction of these residues by utilizing an aliphatic alcohol has been disclosed. However, development work has revealed that upon analysis of the polymer produced from the aforementioned extraction process, the ash content varies considerably, and may occasionally exceed tolerable limits. An acceptable maximum ash content for many polymer uses is about 200 p.p.m. The variations in conditions which cause this result cannot always economically be solved simply by increasing the ratio of extractant to polymer.

It is, therefore, an object of this invention to provide a method for effective removal of organo alkali metal inorganic residues from telechelic polymers.

It is another object to provide a purification method that produces a carboxy-telechelic polymer from its solution in a selected hydrocarbon by alcohol extraction which polymer has an ash content consistently within acceptable limits.

Figure 2:
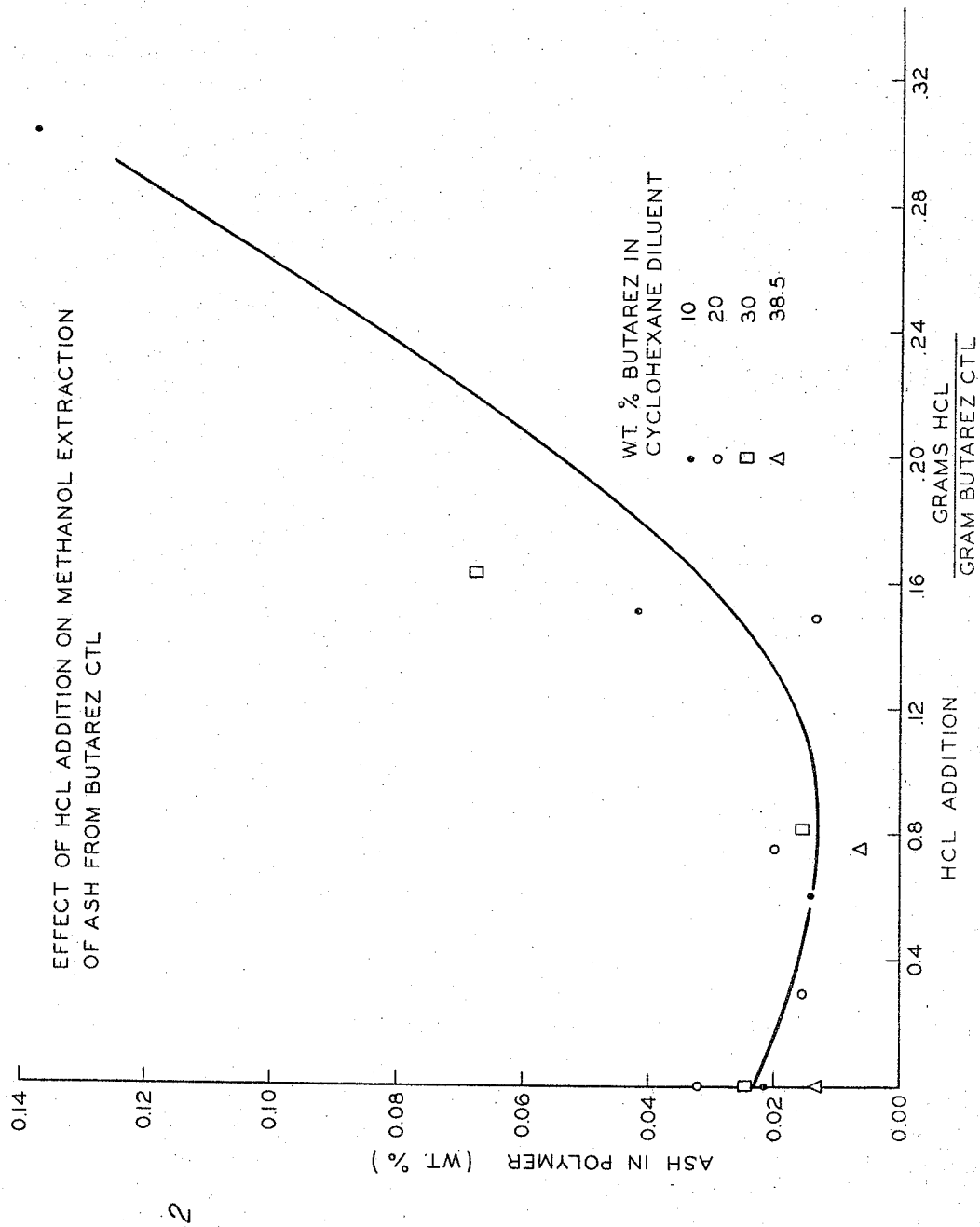

Other objects, aspects, and advantages of the invention will be apparent from a study of the disclosure, the appended claims, and the drawing in which:

FIGURE 1 is a diagrammatic illustration of a continuous process for the practice of this invention, and FIGURE 2 is a composite graph showing the effect on ash content in the recovered purified polymer of various weight percentages of HCl admixed with varying concentrations of polymer in solution.

According to the present invention, an improved method for the removal of alkali metal catalyst inorganic residue from carboxy terminated polymers in hydrocarbon solution has now been provided. The novel method comprises acidification of the carboxy-terminated polymer with anhydrous hydrochloric acid in an amount ranging between 0.01 and 0.14 gram HCl per gram of carboxy telechelic polybutadiene, the optimum ratio will, of course, vary within this range for weight percent polymer in diluent, as well as incidentally with the particular polymer so treated. For example, with carboxy telechelic polybutadiene of 38.5 weight percent polymer in cyclohexane diluent, the optimum addition of HCl is on the order of 0.08 gram HCl per gram of polymer for greatest subsequent catalyst residue removal.

The resulting acidified polymer solution is next treated with a selected extractant, preferably methanol. Through its use in combination with the instant pretreating step substantially complete removal of the alkali metal-containing residue from the polymer solution can be readily accomplished.

By controlling the volume ratio of methanol to polymer solution, good phase separation into (1) a predominantly methanol phase containing all, or almost all of the metal residues, or ash, and (2) a predominantly diluent phase containing almost all of the polymer, can be accomplished. Ash-free polymer is recovered from the diluent phase by any desired means, such as by fractionation, or by coagulation of the polymer with isopropyl alcohol. Further, by maintaining the volumes of methanol per 100 volumes of polymer solution in such a ratio so that the density of the methanol phase is substantially greater than or less than that of the diluent phase, relatively rapid separation of the two phases can be achieved.

In a preferred embodiment, a carboxy telechelic polybutadiene is obtained from polymerization of 1,3-butadiene, in the presence of organolithium initiators to form terminally reactive polymer. Carbonation produces lithium salts, and subsequent neutralization with an acid, typically HCl, produces a carboxy group, and lithium chloride, which is the catalyst inorganic residue. The polymer and catalyst residue, dispersed in the cyclohexane reaction diluent, are passed to an agitated mixing zone, wherein it is to be contacted with the extractant. Prior to entry of the solution into the mixing zone, hydrochloric acid is added in an amount sufficient to insure the acidity thereof.

The term "telechelic" has been coined to define terminally reactive polymers. As used in this specification and in the claims, "telechelic polymers" means polymers of vinylidene-containing monomers which contain a reactive group on each end of the polymer molecule. Polymers in which a terminally reactive group is present on only one end of the polymer chain are designated as "semi-telechelic" polymers. Such polymers can be prepared by various methods including polymerization of vinylidene-containing monomers in the presence of an organo alkali metal catalyst. This invention is illustrated with those telechelic polymers which contain terminal carboxy groups, to be designated as "carboxy-telechelic" polymers.

Briefly, for purposes of the present disclosure and one skilled in the art reading the same, the following is noted:

The preferred monomers are the conjugated dienes containing from 4 to 12 carbon atoms and preferably 4 to 8 carbon atoms, such as 1,3-butadiene, isoprene, piperylene, methylpentadiene, phenylbutadiene, 3,4-dimethyl-1,3-hexadiene, 4,5-diethyl-1,3-octadiene, etc. In addition, conjugated dienes containing reactive substituents along the chain can also be employed, such as for example, halogenated dienes, such as chloroprene, fluoroprene, etc. Of the conjugated dienes, the preferred material is butadiene, with isoprene and piperylene also being especially suitable. Conjugated dienes can be polymerized alone or in admixture with each other.

In addition to the conjugated dienes I can practice my invention with other monomers containing a $$CH_2=C<$$

group such as the vinyl-substituted aromatic compounds. Examples of these compounds include styrene, 3-methylstyrene, 3,5-diethylstyrene, 1-vinylnaphthalene, 2-vinylnaphthalene, and the like. Certain polar monomers can also be employed such as vinylpyridines, vinylquinolines, acrylic and alkacrylic acid esters, and nitriles. Specific examples of these compounds include 2-vinylpyridine, 4-vinylpyridine, 3,5-diethyl-4-vinylpyridine, 5-methyl-2-vinylpyridine, 2-vinylquinoline, 3-methyl-4-vinylquinoline, methyl acrylate, ethyl acrylate, methyl methacrylate, acrylonitrile, and methacrylonitrile. These monomers can be used to form homopolymers or copolymers, including block copolymers, with each other or with conjugated dienes.

The polymers to which my invention may be applied are prepared by contacting the monomer with an organo alkali metal compound. While compounds containing only one alkali metal atom per molecule, such as n-butyllithium, are suitable and will produce mono-terminally reactive polymer, that is, polymer containing a reactive group on only one end of the polymer chain, it is preferred that an organo polyalkali metal compound be employed, for example, containing 2 to 4 alkali metal atoms. This method of removing alkali metal containing residues is particularly applicable to polymer which has been prepared using initiators containing 2 alkali metal atoms.

The organo polyalkali metal compounds can be prepared in several ways, for example, by replacing halogens in an organic halide with alkali metals, by direct addition of alkali metals to a double bond, or by reacting an organic halide with a suitable alkali metal compound.

The organo polyalkali metal compound initiates the polymerization reaction, the organo radical being incorporated in the polymer chain and the alkalimetal atom being attached at each end of the polymer chain. The polymers in general will be linear polymers having two ends; however, polymers containing more than two ends can be prepared. The general reaction can be illustrated graphically as follows:

$$Y-R-Y + X[C_4H_6] \longrightarrow Y-R[C_4H_6]_{+-}Y$$
Organo alkali metal compound  Butadiene or $$Y-[C_4H_6]_n-R-[C_4H_6]_{x-n}-Y$$

or combinations thereof.

A specific example is:

$$Li-(CH_2)_4-Li + X[CH_2=CH-CH=CH_2] \rightarrow$$

$$Li[CH_2-CH=CH-CH_2]_n$$

$$(CH_2)_4-[CH_2-CH=CH-CH_2]_{x-n}-Li$$

In the specific example, 1,4-addition of butadiene is shown; however, it should be understood that 1,2-addition can also occur.

While organo compounds of the various alkali metals can be employed in carrying out the polymerization, by far the best results are obtained with organolithium compounds which give very high conversions to the terminally reactive polymer. With organo compounds of the other alkali metals, the amount of mono-terminally reactive polymer, that is, polymer having alkali metal at only one end of the chain is substantially higher. The alkali metals, of course, include sodium, potassium, lithium, rubidium, and cesium. The organic radical of the organo polyalkali metal compound can be an aliphatic, cycloaliphatic or aromatic radical.

The amount of initiator which can be used will vary depending on the polymer prepared, and particularly the molecular weight desired. Usually the terminally reactive polymers are liquids, having molecular weights in the range of 1,000 to about 20,000. However, depending upon the monomers employed in the preparation of the polymers and the amount of initiator used, semi-solid and solid terminally reactive polymers can be prepared having molecular weights up to 150,000 and higher. Usually the initiator is used in amounts between about 0.25 and about 100 millimoles per 100 grams of monomer.

Formation of the terminally reactive polymers is generally carried out in the range of between $-100$ and $+150°$ C., preferably between $-75$ and $+75°$ C. The particular temperatures employed will depend on both the monomers and the initiators used in preparing the polymers. For example, it has been found that the organolithium initiators provide more favorable results at elevated temperatures whereas lower temperatures are required for effective initiation of polymerization to the desired products with the other alkali metal compounds. The amount of catalyst employed can vary but is preferably in the range of between about 1 and about 30 millimoles per 100 grams of monomers.

The polymerization is generally carried out in the presence of a suitable diluent, such as cyclopentane, methylcyclopentane, cyclohexane, methylcyclohexane, n-pentane, isopentane, n-hexane, n-heptane, isooctane n-decane and the like. Generally, the diluent is selected from hydrocarbons, e.g., paraffins and cycloparaffins containing from 4 to 10 carbon atoms per molecule. As stated previously, the organolithium compounds are preferred as initiators in the polymerization reaction since a very large percentage of the polymer molecules formed contain two terminal reactive groups, and also the polymerization can be carried out at normal room temperatures.

The polymer thus formed is in solution in one of the above-mentioned solvents. This solution can be reacted directly with the desired treating agent, e.g., carbon dioxide. It is sometimes desirable to dilute or concentrate the solution in order to obtain the best viscosity conditions for the carbonation step. The most desirable polymer concentration depends upon the molecular weight of the polymer and the type of polymer and can readily be determined. Extremely dilute solutions can be treated but practical considerations concerning the handling of large quantities of solutions make it desirable to use solutions containing at least about 3 weight percent polymer. As explained above, the molecular weight of the polymer can range from 1000 to 150,000 or higher. The concentration of the polymer in solution ordinarily is not over 20 weight percent.

The temperature of the carbonation reaction should be maintained below 60° F., and preferably at about 40° F. or below. This temperature is best obtained by cooling the solution to between about $-60$ and 60° F. and preferably below 40° F. before introducing it into the reactor.

The polymer is then treated with a suitable reagent, such as anhydrous HCl, to convert the metal salt groups to carboxy groups. The reactions which take place are typified by the following equation, wherein P designates a polymer chain.

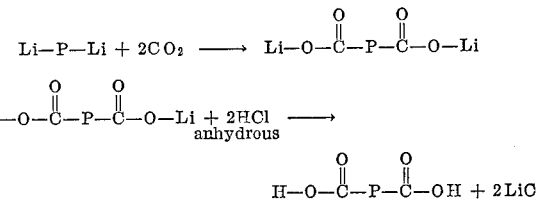

The amount of methanol employed will depend upon the concentration of the polymer solution and the diluent used in the polymerization. The basic method involves the removal of lithium-containing material from a telechelic polymer solution by washing the polymer solution with an amount of methanol sufficient to dissolve the lithium-containing material, but insufficient to coagulate the polymer, and to provide methanol and polymer solution phases of sufficient difference in density that phase separation readily occurs. When the polymerization diluent is cyclohexane, and when it is used in an amount to give a polymer concentration of around 5 to 10 weight percent, the amount of methanol required for optimum results is in the range of 60 to 100 volumes per 100 volumes of polymer solution, based on the cyclohexane. Generally the alcohol wash is conducted at a temperature below the boiling point of the alcohol, preferably in the range of 50–125° F. for methanol.

The method of this invention is particularly applicable to telechelic polymers of relatively low molecular weight, i.e., 30,000 and below, frequently around 5,000, and is of special interest for the treatment of carboxy-telechelic polymers. Methanol is an agent for the removal of lithium compounds, which, if left in the polymer, would appear as ash in the finished product. The process is carried out under essentially anhydrous conditions and products of unusually low ash content are obtained. Lithium compounds are removed from polymers down to around 0.05 weight percent or less, and in many instances analysis had shown the absence of lithium-containing residues.

FIGURE 1 of the drawing will now be described. A carboxy-telechelic polymer solution comprising, for example, carboxy-telechelic polybutadiene disposed in cyclohexane reaction diluent, passes via conduit 6 to agitated mixer 7. Conduit 8 introduces a stream of hydrochloric acid to conduit 6. Conduit 9 separately introduces a stream of methanol to mixer 7. The effluent from mixer 7 passes via conduit 11 to a phase separator 12, wherein the separation of the mixture into an upper methanol phase and a lower hydrocarbon diluent phase occurs. The residence time ranges up to several hours in the separator.

A lower diluent phase is withdrawn from separator 12 via conduit 13 and comprises the carboxy-telechelic polymer, diluent and some methanol. This phase passes to a polymer recovery zone 14, wherein purified polymer is separated and withdrawn via conduit 16. Diluent saturated with methanol is withdrawn via conduit 17 and recycled to the reactor (not shown) subsequent to methanol removal by conventional methods (not shown).

An upper methanol phase is withdrawn overhead from vessel 12 via conduit 18 and passed to a separation vessel 19, such as a fractionator. The bottom stream 21 therefrom comprises essentially all lithium chloride residue from the catalyst, some methanol and polymer which was dissolved in this phase. Overhead vapor from fractionator 19 comprises a predominantly methanol-cyclohexane stream, which may be condensed such as by cooler 22 and returned to mixer 7 via conduit 23.

Example

Several runs were made with samples of an unpurified carboxytelechelic polybutadiene in cyclohexane diluent to determine the effect of acidification of the polymer solution prior to the conventional alcohol extraction step upon the ash content of recovered polymer.

A quantity of Butarez CTL polymer, which was initially HCL-free, was divided and diluted into four portions of 10, 20, 30 and 38.5 weight percent polymer in cyclohexanes diluent. Aliquots were prepared from each of the four portions of varying polymer concentration. Next, increasing amounts of anhydrous HCl were admixed with each aliquot of a given polymer concentration, followed by a quantity of methanol extractant equal in volumes to that of the acidified aliquot. The resulting admixtures were shaken for 1½ minutes, then allowed to stand overnight to assure complete phase separation. Then, conventional recovery of the purified polymer and analysis for ash content followed. The quantities of reactants employed and corresponding results are given below for a 10 percent weight percent Butarez CTL in cyclohexane.

TABLE I.—ASH CONTENT IN POLYMER RECOVERED FROM ACIDIFIED AND METHANOL EXTRACTED 10% POLYMER SOLUTION

| Run No. | Polymer Solution (ml.) | HCl Added (ml.) | CH₃OH Vol. Added (ml.) | Ash Content (p.p.m.) |
|---|---|---|---|---|
| 1 | 50 | | 50 | 230 |
| 2 | 50 | 0.1 | 50 | 140 |
| 3 | 50 | 0.5 | 50 | 410 |
| 4 | 50 | 1 | 51 | 1,370 |
| 5 | 50 | 3 | 53 | 2,360 |
| 6 | 50 | 5 | 55 | 700 |
| 7 | 50 | 6 | 56 | 1,300 |
| 8 | 50 | 7 | 57 | 2,800 |

It will be noted that only 0.1 ml. of HCl brings ash content well below 200 p.p.m. HCl in excess of that is wasted and indeed has an adverse effect of ash content. The second minimum reached at about 5 ml. HCl is much higher than the first minimum and quite wasteful of acid.

Next, the aliquots comprising 20 weight percent polymer in diluent were admixed with increasing amounts of HCl and equal volumes of methanol as previously described. The quantities used and corresponding results are given in Table II.

TABLE II.—ASH CONTENT IN POLYMER RECOVERED FROM ACIDIFIED AND METHANOL EXTRACTED 20 WEIGHT PERCENT POLYMER IN SOLUTION

| Run No. | Polymer Solution (ml.) | HCl Added (ml.) | CH₃OH Added (ml.) | Ash Content (p.p.m.) |
|---|---|---|---|---|
| 9 | 50 | | 50 | 320 |
| 10 | 50 | 0.2 | 50 | 160 |
| 11 | 50 | 0.5 | 50 | 195 |
| 12 | 50 | 1.0 | 51 | 140 |
| 13 | 50 | 3.0 | 53 | 10,900 |
| 14 | 50 | 5.0 | 55 | 10,400 |

It will be noted that as little as 0.2 ml. up to about 1 ml. HCl substantially reduces ash content to about or below 200 p.p.m. HCl addition in excess of this has a markedly adverse effect on ash content of the recovered polymer.

Next, aliquots comprising 30 weight percent polybutadiene in cyclohexane were admixed with HCl and CH₃OH as previously described. The quantities used and corresponding results are given in Table III.

TABLE III.—ASH CONTENT IN POLYMER RECOVERED FROM PRE-ACIDIFIED AND METHANOL-EXTRACTED 30 WEIGHT PERCENT POLYMER IN SOLUTION

| Run No. | Polymer Solution (ml.) | HCl Added (ml.) | CH₃OH Added (ml.) | Ash Content (p.p.m.) |
|---|---|---|---|---|
| 15 | 30 | | 30 | 240 |
| 16 | 30 | 0.5 | 30 | 150 |
| 17 | 30 | 1.0 | 31 | 670 |
| 18 | 30 | 3.0 | 33 | 1,180 |
| 19 | 30 | 5.0 | 35 | 3,630 |

It will be observed that 0.5 ml. HCl drops ash content by more than a third. Again, excess HCl results in a rapid increase in ash content.

Finally aliquots comprising 38.5 weigh percent polymer in diluent were admixed with HCL and CH₃OH as with the other concentrations. The volumes used and corresponding results are given in Table IV.

TABLE IV.—ASH CONTENT IN POLYMER RECOVERED FROM PRE-ACIDIFIED AND METHANOL-EXTRACTED 38.5 WEIGHT PERCENT POLYMER IN SOLUTION

| Run No. | Polymer Solution (ml.) | HCl Added (ml.) | CH$_3$OH Added (ml.) | Ash Content (p.p.m.) |
|---|---|---|---|---|
| 20 | 50 | | 50 | 130 |
| 21 | 50 | 1.0 | 51 | 60 |
| 22 | 50 | 3.0 | 53 | 7,500 |
| 23 | 50 | 5.0 | 55 | 3,080 |

It will be noted that some reduction in ash content is achieved at 1.0 ml. HCl addition below the initially low ash content of this sample.

The data from the foregoing four tables were all converted to a common denominator of grams of HCl per gram of carboxy-telechelic polybutadiene for purposes of plotting on a graph to ascertain the region of optimum reduction of ash content. This resulting plot and composite curve are shown in FIGURE 2. If 200 p.p.m. or below of ash are determined as the specification of Butarez CTL for a particular application, then the range of HCl addition to meet this requirement is about 0.01 to 0.14 gram HCl per gram of Butarez CTL.

It is readily apparent for higher or lower specifications on ash content, the range of HCl addition would be correspondingly broadened or narrowed. Similarly, for other carboxy-terminated polymers, the optimum range of HCl addition would have to be determined experimentally.

Reasonable variation and modification are possible within the scope of the foregoing disclosure, the drawing, and the appended claims to the invention.

I claim:

1. In a process for the purification and recovery of an HCl-free carboxy-terminated polymer from a solution of said polymer and a hydrocarbon diluent also containing an alkali metal halide by admixing the polymer solution with sufficient methanol which will form a methanol phase and a diluent phase upon standing, and which will remove from the solution into the resulting methanol phase said residue, and wherein the two phases are separated, the improvement comprising, before the methanol addition, adding to said solution anhydrous hydrogen chloride in an amount ranging between 0.01 to 0.14 gram HCl per gram of said polymer, and recovering the polymer substantially free from said catalyst residue from the resulting diluent phase.

2. The process of claim 1 wherein the resulting methanol phase is fractionated to recover a vapor product comprising a major amount of methanol and a minor amount of diluent, and a kettle product comprising methanol, said alkali metal halide, and a small portion of said polymer.

3. The process of claim 2 wherein said vapor product comprising a major portion of methanol and a minor amount of diluent is subjected to condensation and then passed to the polymer solution after the said anhydrous hydrogen chloride is added thereto.

4. The process of claim 3 wherein said carboxy-terminated polymer is carboxy-terminated polybutadiene and said alkali metal halide is lithium chloride.

References Cited by the Examiner

UNITED STATES PATENTS 1,515,001   11/1924   Von Girsewald et al. ___ 23—89
3,108,994   10/1963   Zelinski _____ 260—94.7

OTHER REFERENCES

Hodgeman, C. D., ed.: Handbook of Chemistry and Physics, 34th ed., Chemical Rubber Publishing Co., (1952), pp. 518–519.

JOSEPH L. SCHOFER, *Primary Examiner.*

H. I. CANTOR, *Assistant Examiner.*